(12) United States Patent
Wilson Van Horn

(10) Patent No.: US 9,799,206 B1
(45) Date of Patent: Oct. 24, 2017

(54) METHOD FOR AUTOMATING EMERGENCY DISTRESS SIGNALS FROM A NETWORKED PERIPHERAL DEVICE

(71) Applicant: Brenda Michelle Wilson Van Horn, Packwood, WA (US)

(72) Inventor: Brenda Michelle Wilson Van Horn, Packwood, WA (US)

(73) Assignee: Brenda Michelle Wilson Van Horn, Packwood, WA (US)

( * ) Notice: Subject to any disclaimer, the term of this patent is extended or adjusted under 35 U.S.C. 154(b) by 340 days.

(21) Appl. No.: 14/589,698

(22) Filed: Jan. 5, 2015

(51) Int. Cl.
| | |
|---|---|
| *H04N 7/18* | (2006.01) |
| *G08B 25/01* | (2006.01) |
| *G08B 7/06* | (2006.01) |
| *G10L 15/22* | (2006.01) |

(52) U.S. Cl.
CPC ............ *G08B 25/016* (2013.01); *G08B 7/06* (2013.01); *G10L 15/22* (2013.01); *H04N 7/188* (2013.01)

(58) Field of Classification Search
CPC .................................. H04N 7/188; G08B 7/06
See application file for complete search history.

(56) References Cited

U.S. PATENT DOCUMENTS

| | | | | |
|---|---|---|---|---|
| 2013/0065569 A1* | 3/2013 | Leipzig | .................. | H04W 8/22 455/416 |
| 2014/0120872 A1* | 5/2014 | Amis | ................ | H04M 1/72541 455/411 |
| 2014/0294161 A1* | 10/2014 | O'Conor | ............. | H04M 3/5116 379/45 |
| 2015/0065082 A1* | 3/2015 | Sehgal | .................... | H04W 4/22 455/404.2 |

\* cited by examiner

*Primary Examiner* — Md Haque
(74) *Attorney, Agent, or Firm* — Williams Intellectual Property; Benjamin F. Williams

(57) ABSTRACT

A method for automating emergency distress signals from a networked peripheral device to enable automated emergency distress signal activation from a networked peripheral device when a code word is sensed spoken proximal said peripheral device and when position of said peripheral device is sensed outside an established pattern of movement of said peripheral device coordinated in space and time. The present method for automating emergency distress signals from a networked peripheral device further enables a user to receive an apparent call from another person and thus affect action by a user, as desired, such as, for example, leave a situation promptly having a social pretext, as supplied by the receipt of the apparent call, for so leaving.

9 Claims, 5 Drawing Sheets

METHOD FOR AUTOMATING EMERGENCY DISTRESS SIGNALS FROM A NETWORKED PERIPHERAL DEVICE

COPYRIGHT NOTICE

Some portions of the disclosure of this patent document may contain material subject to copyright protection. The copyright owner has no objection to the facsimile reproduction by anyone of the patent document or ensuing disclosure as it appears on record at the Patent and Trademark Office, but otherwise reserves all copyright rights whatsoever.

BACKGROUND OF THE INVENTION

Various types of methods of sending emergency distress signals from a networked peripheral device are known in the prior art. However, what is needed is a method for automating emergency distress signals from a networked peripheral device that includes generation of a pattern of movement typical of a user, said pattern of movement writable to memory, wherein deviation from said pattern of movement is ascertainable to generate automated issuance of an emergency distress signal, and use of at least one programmable code word is identifiable by matching of audio signal waveforms, whereby concealed activation of an emergency distress signal is enabled upon a peripheral device sensing utterance of said code word and recording and streaming of proximal audio and video data capturable by the peripheral device is likewise enabled. The present method for automating emergency distress signals from a networked peripheral device further includes enabling a self-call, wherein the appearance of a user receiving a call is elicited and a social pretext is thereby creatable for a user to undertake otherwise potentially questionable or inexplicable behavior, whereby a user may ward off approaching danger.

FIELD OF THE INVENTION

The present invention relates to a method for automating emergency distress signals from a networked peripheral device, and more particularly, to a method for automating emergency distress signals from a networked peripheral device that includes running a software application administrative of the method upon a peripheral device having at least one processor, said peripheral device connectable in network with additional hardware and wireless communications devices, wherein a pattern of movement typical of a user porting the peripheral device is generative over time, whereby deviation from said pattern of movement is ascertainable and automated issuance of an emergency distress signal is thereby elicited.

Further, utterance of a code word sensible by the peripheral device also automates issuance of an emergency distress signal to alert emergency responders and other parties the user is in clear and present danger. The code word is written to memory and a waveform of said code word is generated. Subsequent utterance of the code word thus presents a waveform comparable to the stored waveform, whereby matching of the waveforms within a range of accuracy is required to initiate issuance of the emergency distress signal, or for controlling additional steps presented by the instant method, as are described subsequently, whereby select use of speech by a particular user enables automation of emergency distress signals, activation of a self-call, recording of audio and video data capturable by the peripheral device, and streaming of said audio and video data, among other features presently set forth herein.

SUMMARY OF THE INVENTION

The general purpose of the method for automating emergency distress signals from a networked peripheral device, described subsequently in greater detail, is to provide a method for automating emergency distress signals from a networked peripheral device which has many novel features that result in a method for automating emergency distress signals from a networked peripheral device which is not anticipated, rendered obvious, suggested, or even implied by prior art, either alone or in combination thereof.

The present method of automating emergency distress signals from a networked peripheral device has been devised to enable emergency distress signal activation upon a peripheral device whereby emergency responders and other parties are alerted that an emergency is befalling a user without said user having to take specific action outside the utterance of a particular code word previously programmed into the peripheral device. The emergency distress signal activation is thus concealed from others present.

The present method of automating emergency distress signals from a networked peripheral device further tracks a user's movements by positioning of the peripheral device recorded over a period of time, whereby a pattern of movement typical of the user is established. Deviation outside the pattern of movement may trigger issuance of an emergency distress signal if the peripheral device is not otherwise manipulated to prevent issuance of said emergency distress signal.

The term "peripheral device", as used herein throughout, is taken to include all handheld computing devices capable of connecting to a wireless network, such as, for example smart phones, cellular phones, handhelds, tablets, personal digital assistants ("PDAs"), or other wireless communications devices ("WCDs") available having at least one processor able to execute a software application administrative of the present method and connectable to a wireless network whereby communication with additional hardware and other users is enabled.

The present method for automating emergency distress signals from a networked peripheral device, therefore, enables concealed and automated issuance of an emergency distress signal to emergency responders and law enforcement dispatchers, among other parties, whereby expedient action may be taken to avert emergency and apprehend any perpetrator attempting to commit a crime against a user.

The present method for automating emergency distress signals from a networked peripheral device, therefore, is administered by a software application runnable upon a peripheral device. Once loaded to a peripheral device, the present method includes enabling writing to memory a pattern of movement typical of the user over space and time. For example, a user with a regular schedule (such as a student, for example, or young child) may establish a pattern of movement from which any deviation is readily ascertainable. Deviation from an established pattern of movement effects issuance of an emergency distress signal. Deviation from an established pattern of movement may include, for example, abrupt movement at speed away from known places of presence, as recorded over time. Deviation may include location data of the user at unknown places, restricted places, or a certain distance from a particular location (such as, for example, a home or school).

The present method, therefore, includes communication with a global positioning system ("GPS") whereby location data is recordable relative a map or other coordinate system enabling ascertainment of position and location data. Once a pattern of movement is established, deviation therefrom is ascertainable when unique movement is assessed relative a history of movement recorded as a pattern of movement. Distance outside a designated area, travel at atypical speeds outside certain times, and other factors are measurable by which deviation is recognizable.

Thus a child traveling by car during school hours, for example, is sensed as a deviation whereby the emergency distress signal is issuable. A user sensed outside a designated area, such as more than five miles, for example, from a specific location (such as a school, for example) during a certain time period (such as school hours during the week, for example) is sensible as a deviation. Travel away from a location when the pattern of movement typically records travel towards a location during that time is also sensible as a deviation. Other factors sensible of a deviation are contemplated as part of this invention.

Should a user desire to voluntarily undertake an atypical movement relative a history of recorded patterns of movement, said user may disable the activation of the emergency distress signal, as desired, whereby an atypical journey, for example, does not trigger the emergency distress signal.

The present method for automating emergency distress signals from a networked peripheral device further includes use of a code word or phrase (herein collectively "code word") to automate issuance of an emergency distress signal in a manner concealed from other people nearby. A user may record a word, phrase, tone, or other audio signal as the code word. The audio signal is thence mapped as a waveform and written to memory as the code word. When the peripheral device is activated and the software application is run, utterance of the code word within range of the peripheral device elicits activation of the emergency distress signal. Sensed speech must present a waveform matched within a range of accuracy to the recorded waveform representative of the code word. Thus the waveform restricts use of the code word to a particular user, the user who recorded the code word, whereby accidental triggering of the emergency distress signal by code word (when uttered by another person, for example) is preventable.

Multiple code words are storable to the peripheral device whereby the emergency distress signal is issuable after any code word is sensed. Recording multiple code words enables issuance of the emergency distress signal in a plurality of situations or with vocalizations uttered at different amplitudes and frequencies (such as, for example, at a whisper). When a plurality of code words is recorded to the device, any one of the code words is usable to elicit the emergency distress signal or to automate additional features of the present method for automating emergency distress signals from a networked peripheral device, as will be described subsequently.

The present method for automating emergency distress signals from a networked peripheral device further enables a self-call whereby the peripheral device sounds a ringtone and a recorded message is playable to generate the appearance of the user receiving a call. Failure to answer the call will write the recorded message to voicemail, whereby the voicemail tone is sounded. A user may, therefore, set up a self-call at a certain time, after a certain interval of time has passed, or after a certain interval of time has passed after a code word has been sensed, whereby the appearance of receiving a call enables a social pretext explanatory of subsequent action taken by the user. Thus situations may be avoided where a phone call may disrupt or otherwise legitimize a user's action whereby a user is able to better respond to a situation, or deliver social cues effective to support otherwise inexplicable or questionable behavior.

The present method for automating emergency distress signals from a networked peripheral device further enables preprogrammed calls to anther party whereby a recorded message is playable upon receipt of the call. The preprogrammed calls may be placed according to a set schedule, whereby the party receiving the calls ("other party") is alerted to any break or irregularity in said schedule whereby appropriate action is then prompted by said other party. The schedule of preprogrammed calls can be altered, interrupted, and likewise controlled by utterance of a code word or code words, as case may be, whereby different prerecorded messages may be played to the other party after a particular code word has been sensed, for example.

It should be further understood that the present method for automating emergency distress signals from a networked peripheral device enables recording of audio and/or video data sensed by the peripheral device and streaming of said audio and/or video data to emergency dispatch, or other party, when a code word is sensed. Thus, the present method for automating emergency distress signals from a networked peripheral device enables secretive recording of proceedings proximal a user porting said peripheral device, whereby use of uttered words, programmable into the peripheral device, activates and deactivates recording and/or streaming of said video and/or audio data.

The present method of automating emergency distress signals from a networked peripheral device, therefore, enables capture of audio and video data from and through a peripheral device when activated by a user. A user may activate said capturing of audio and video data by use of a code word, or by manually manipulating the peripheral device, as preferred, by assigning hot buttons. The term "hot buttons", as used herein throughout, is taken to mean assigning a function to any button on the peripheral device specific to the features enabled by the present method, and operative therefor when the software application administrative of the method is operative upon the peripheral device.

The emergency distress signal may include an alert message to any peripheral device operating the software application administrative of the present method available within a proximal range of the peripheral device issuing the emergency distress signal. The alert message may include additional information indicative of the emergent situation, such as, for example, "attempted abduction in progress", "attempted rape in progress", "minor in danger" and other such text alert modifiers programmable by a user and issuable according to utterance of programmed and particular code words or prompted by hot buttons. Receivers of an alert message are thus alerted to remain vigilant, to bear witness, call for help, or take other appropriate action as circumstance may dictate. The alert message may also include a picture of the user, whereby passersby may recognize the user and take appropriate action, as desired. A user may, therefore, take a photograph of themselves and store said picture to memory whereby said picture is transmissible as part of the emergency distress signal or alert message, to aid emergency responders and other parties in identifying the user. The alert message may include further identifying data, such as, for example a photo of the user's car, VIN, license plate number, or other information facilitative of recognition of said user.

Thus has been broadly outlined the more important features of the present method for automating emergency distress signals from a networked peripheral device so that the detailed description thereof that follows may be better understood and in order that the present contribution to the art may be better appreciated.

Objects of the present method for automating emergency distress signals from a networked peripheral device, along with various novel features that characterize the invention are particularly pointed out in the claims forming a part of this disclosure. For better understanding of the method for automating emergency distress signals from a networked peripheral device, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 7 thereof, examples of the instant method for automating emergency distress signals from a networked peripheral device employing the principles and concepts of the present method for automating emergency distress signals from a networked peripheral device and generally designated by the reference number 10 will be described.

Referring to FIGS. 1 through 7 a preferred embodiment of the present method for automating emergency distress signals from a networked peripheral device 10 is illustrated.

Figure 1:
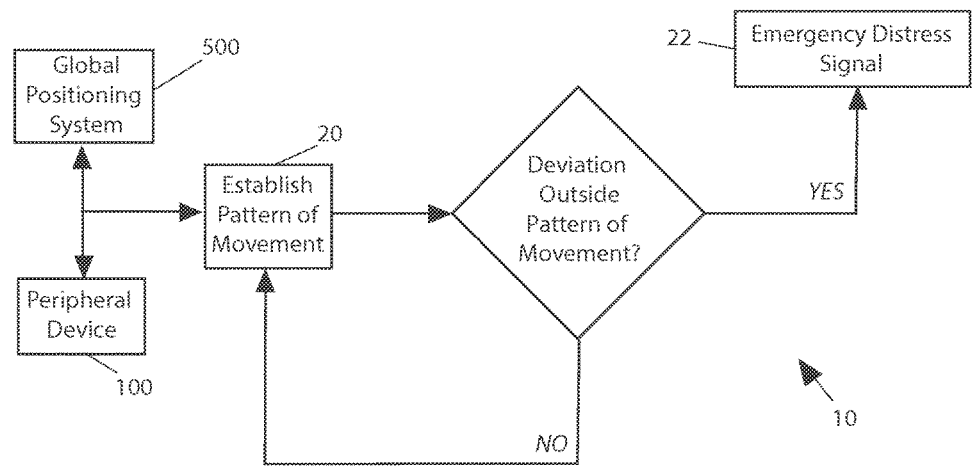
FIG. 1 is a block diagram view of an example embodiment illustrating the establishment of a pattern of movement of a user and issuance of an emergency distress signal once a deviation in said pattern of movement is detected.
Figure 2:
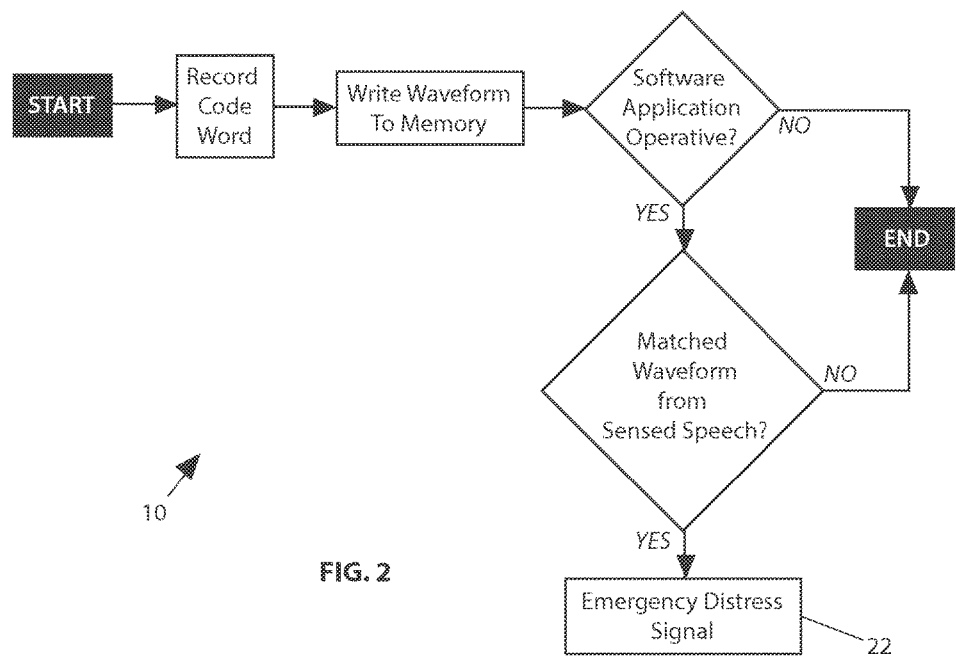
FIG. 2 is a block diagram view of an example embodiment illustrating recording a code word as a wave form for verification against and thereby control issuance of an emergency distress signal.
Figure 3:
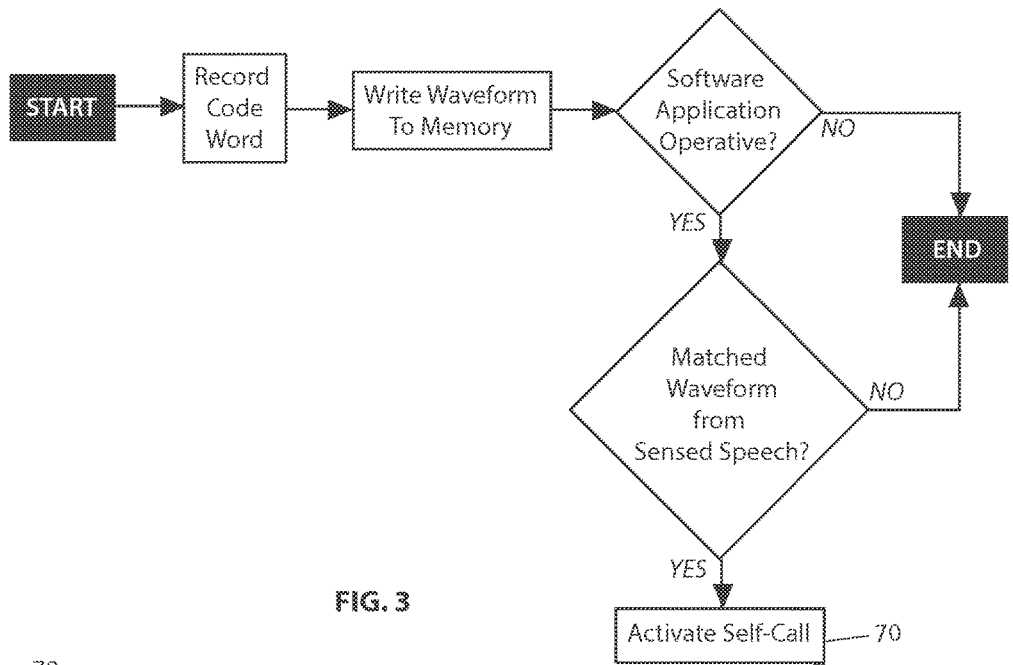
FIG. 3 is a block diagram view of an example embodiment illustrating use of a code word to initiate a self-call and playback of a recorded message.

The present method for automating emergency distress signals from a networked peripheral device 10 has been devised to enable automated emergency distress signal activation from a networked peripheral device 100 when a code word 50 is sensed spoken proximal said peripheral device 100 (see FIG. 2) and when position of said peripheral device 100 is sensed outside an established pattern of movement 20 of said peripheral device 100 coordinated in space and time (see FIG. 1). The present method for automating emergency distress signals from a networked peripheral device 10 further enables a user to receive a self-call 70—an apparent call from another person—and thus affect action by a user, as desired, such as, for example, departing a situation promptly by creation of a social pretext, as supplied by the receipt of the apparent call, explanatory of such departure (see FIG. 3).

The term "peripheral device", as used herein throughout, is taken to include all computing devices connectable in network and having at least one processor able to run a software application enabled to administer the method subsequently described. As such, the term "peripheral device", therefore, includes handhelds, smart phones, wireless communications devices ("WCDs"), laptops, tablets, and any other portable computing device wirelessly connectable in network with third party hardware and communicable therewith.

Figure 5:
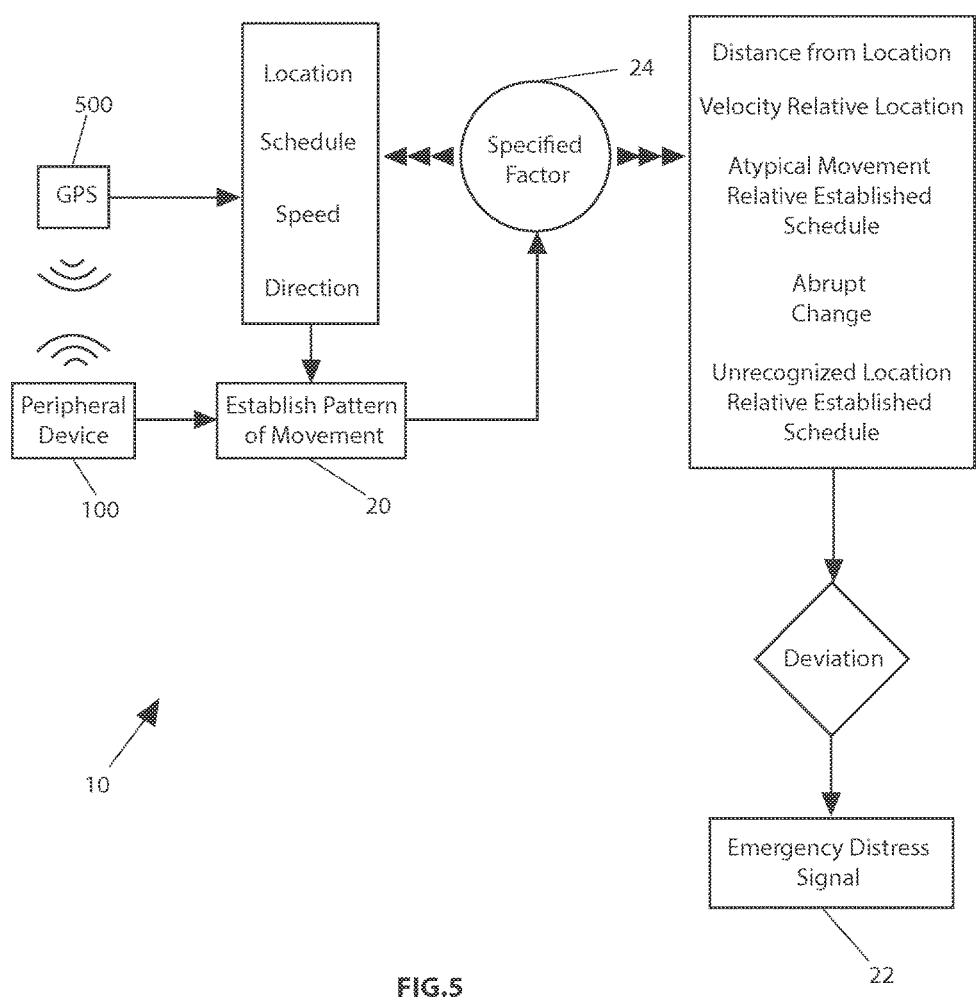
FIG. 5 is a block diagram view of an example embodiment illustrating determination of a deviation from an established pattern of movement by analysis of specified factors against the established pattern of movement.

As shown in FIGS. 1 and 5, the present method for automating emergency distress signals from a networked peripheral device 10 records and writes a pattern of movement 20 to memory indicative of typical spatial positioning of a peripheral device 100 carried by a user over time. Thus, for example, a student's whereabouts, which are generally dictated according to a set and known schedule, are recordable as a typical pattern of movement 20. The peripheral device 100 thus communicates with a Global Positioning System ("GPS") 500 when the software application runs the method 10 to establish the pattern of movement 20. Deviation from said pattern of movement 20 by a specified factor 24 is thereby recognizable relative said stored pattern of movement, and an emergency distress signal 22 is thence issuable in response to said sensed deviation.

The specified factor 24 includes a distance factor, whereby deviation by a certain distance from known locations typical of a user's movements according to a known schedule effects issuance of the emergency distress signal 22. Other movements that are not correlative to known patterns of movement as recorded over time may also effect issuance of the emergency distress signal 22, as shown in FIG. 5, including, for example, inconsistent velocity relative a location previously established in the pattern of movement expected at a certain time ("velocity relative location"), such as a user traveling away from an expected location at an unexpected or atypical speed; present location data not consistent with expected location according to the established schedule ("atypical movement relative established schedule"); a sudden or unexpected change in movement ("abrupt change") outside an acceptable variance within an established pattern of movement; and a present location unrecognized relative an expected location as part of an established schedule ("unrecognized location relative established schedule").

The present method for automating emergency distress signals from a networked peripheral device 10 may be deactivated by a user when preferred, to prevent a unique pattern of voluntary movement from triggering issuance of the emergency distress signal 22. Thus an atypical movement is preventable from triggering the emergency distress signal 22, when desired.

Voice recognition of a spoken term or phrase by a user as a code word 50 to trigger an emergency distress signal 22 is effective when the peripheral device 100 is running the software application. Utterance of said code word 50 in range of the peripheral device 100 is sensed by the peripheral device 100 and an emergency distress signal 22 is automatically issued. A user may program the code word 50 by recording the term or phrase and entering said code word or phrase into the peripheral device 100 designated as the code word 50. The peripheral device 100 digitizes the audio signal to match waveforms and thus recognize not just the code word 50 in speech, but also the voice of the user whereby utterance of the code word 50 by a person other than the user does not effect transmission of the emergency distress signal 22 (see, for example, FIGS. 2 and 3).

Figure 6:
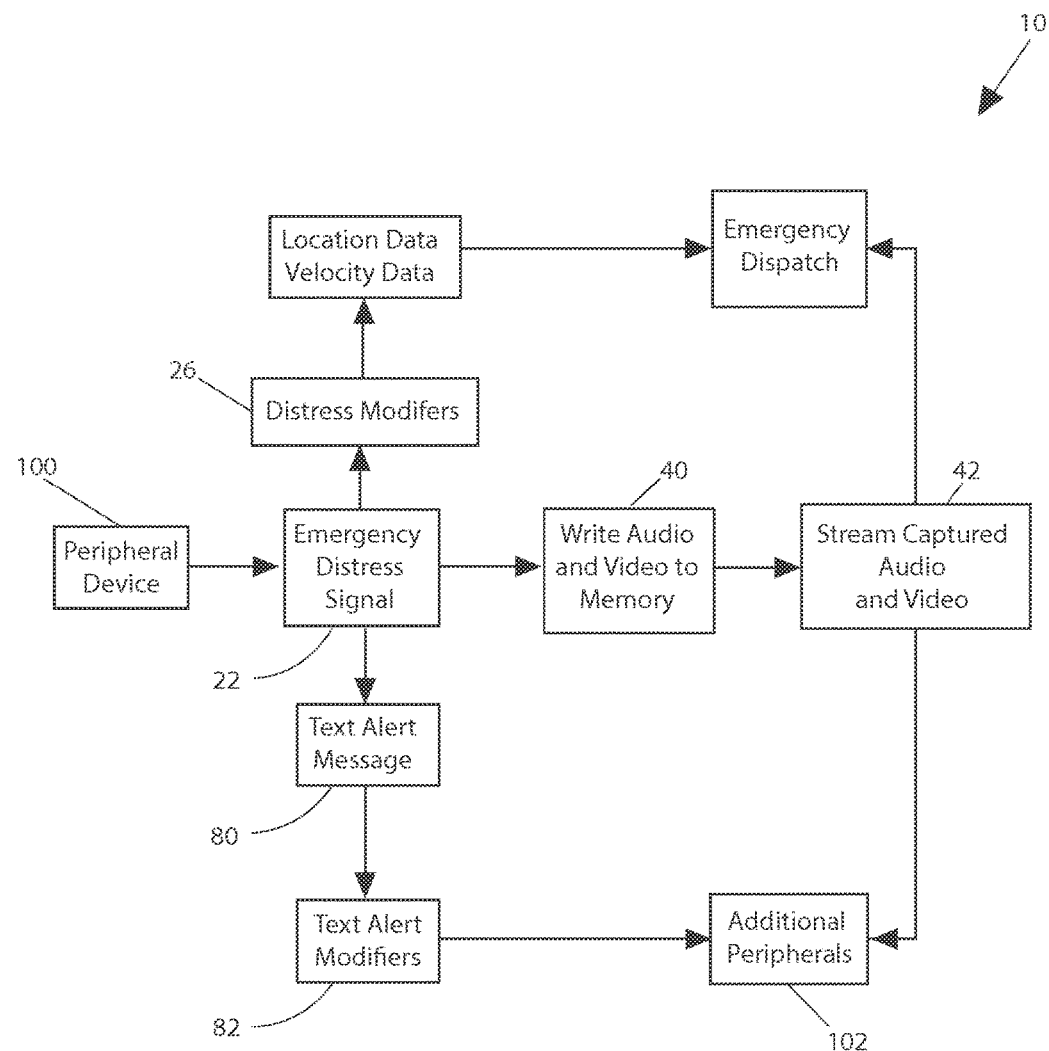
FIG. 6 is a block diagram view of an example embodiment illustrating issuance of an emergency distress signal and a text alert message.

The code word 50 thus enables a user to activate an emergency distress signal 22 by uttering a particular word of phrase whereby an assailant or perpetrator is unaware an emergency distress signal 22 has been issued. As shown in FIG. 6, the emergency distress signal 22 may include distress modifiers 26 whereby information is provided to emergency dispatch including the location and velocity of a user. Distress modifiers 26 may also include additional information, as triggered by utterance of particular code words 50, whereby a user can signal the type of distress playable to emergency dispatch, such as, for example, "attempted rape", "armed robbery", "abduction", and other programmable distress modifiers sendable as part of an emergency distress signal 22. Location and velocity data are sendable with every emergency distress signal 22.

The emergency distress signal 22 is transmissible to emergency responders, dispatch, and other peripheral devices 102, whereby emergency responders and other parties (such as, for example, parents) may be notified of an emergent situation regarding the user whereby appropriate action may be undertaken. Code words 50 may be used to determine how an emergency distress signal 22 is relayed, and to whom.

Figure 7:
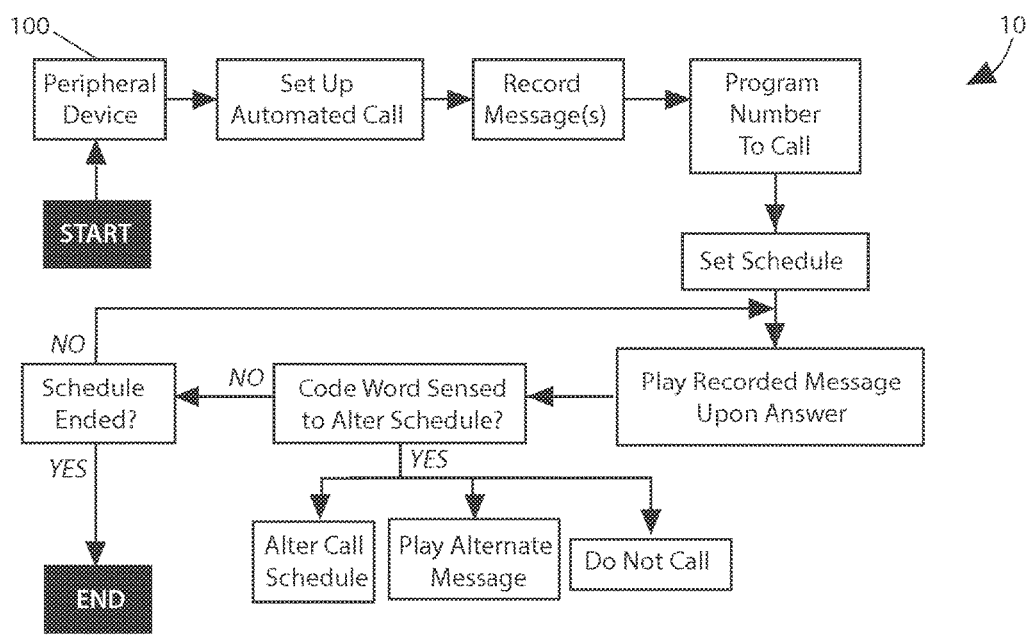
FIG. 7 is a clock diagram view of an example embodiment illustrating set up and execution of a scheduled call to another party with a prerecorded message playable upon receipt, wherein alteration to said schedule is effective by utterance of a code word.

As is shown in FIG. 7, the present method for automating emergency distress signals from a networked peripheral device 100 further enables automating a call according to a programmable schedule to a desired telephone number whereby a recorded message is playable once the call is received. A user may, therefore, record a specific message and effect automated dialing to a desired person according to a desired schedule whereby the desired person is connected with and the message automatically played. Interruption of the schedule may be effected, whereby the desired person does not receive the scheduled call, the call is placed at a different time, or a different prerecorded message is played, when a particular code word is sensed, or by other means effected by a user manipulating the peripheral device 100. Interruption of the scheduled call may alert the desired person that an action is then appropriate.

Figure 4:
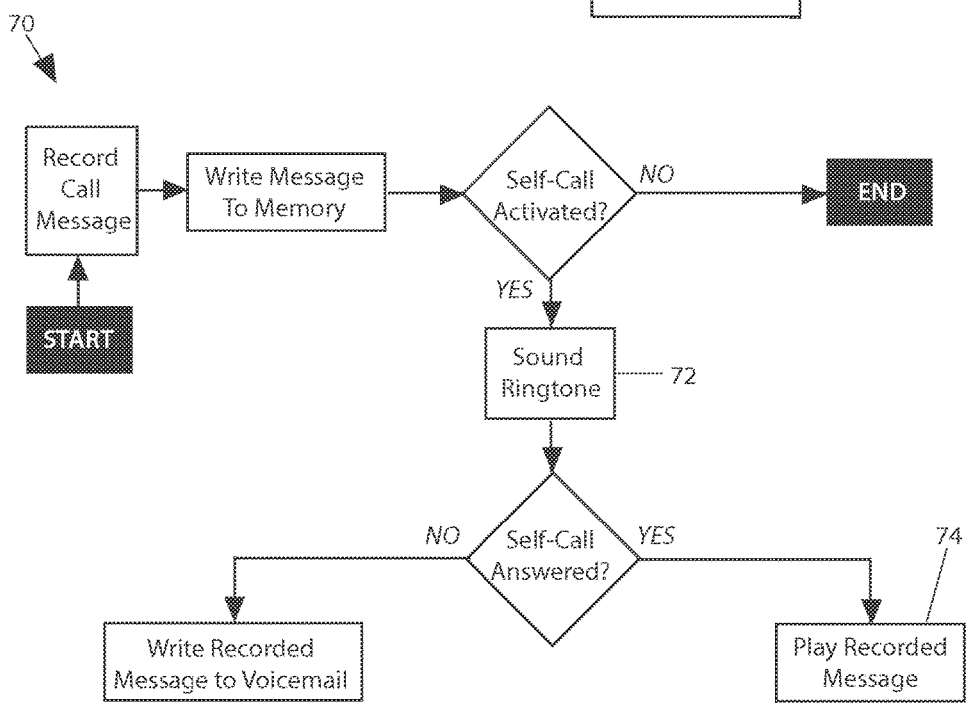
FIG. 4 is a block diagram view of an example embodiment illustrating playback of a recorded message once a self-call has been initiated.

A further feature enabled by the present method for automating emergency distress signals form a networked peripheral device 10 includes enabling an automated self-call 70 whereby the appearance of receiving a call from another party is elicited. As is shown in FIG. 4, the present method thus enables the sounding of an automated ringtone 72 upon the peripheral device 100 after a desired time interval, when selected, and alternately when a code word 50 is sensed in the speech of a user, wherein the peripheral device 100 plays a recorded message 74 when answered and the appearance of the user receiving a call is elicited. Thus a user may prompt an automated call to themselves and, upon answering this self-call 70, observers may be persuaded a call has been received whereby the user is required to take action. A user may, therefore, use the automated self-call 70 feature of the present method 10 to invent a pretext for departing a particular situation when social convention may otherwise make such departure questionable or inexplicable, and therefore difficult.

Still a further feature of the present method for automating emergency distress signals form a networked peripheral device 10 includes prompting observation and appropriate action from nearby parties using the present method. The present method for automating emergency distress signals from a networked peripheral device 10, therefore, enables sounding of an alert message 80 on additional peripheral devices 102 running the software application within a certain range of the issuing peripheral device 100 when an emergency distress signal 22 is issued. Nearby users, therefore, can respond, bear witness, or otherwise take appropriate action as desired. The alert messages 80 may be programmed by the user in response to specific code words 50 to display text alert modifiers 82 informative of the emergency underway whereby certain actions are prompted.

The alert message 80 and emergency distress signal 22 may include a photograph of the user, captured previously by said user's peripheral device 100 and transmissible as part of the text alert message 80 and emergency distress signal 22, whereby recognition of the user to passersby and emergency responders is facilitated.

The present method for automating emergency distress signals from a networked peripheral device 10 also enables writing of sensed audio and video data to memory 40, and streaming said audio and video data 42 captured by the peripheral device 100 to emergency dispatch, whereby witnessing of proximal events is enabled and therefore usable as testimony at a subsequent time, as case may be (see, for example, FIG. 6). Activation of writing sensed audio and video data to memory 40 is enabled by utterance of a code word 50 or manipulation of the peripheral device 100 by a user. Writing of audio and video data 40 and streaming of said data 42 may be automated when deviation from a recorded pattern of movement 20 is detected. Streaming of said data 42 may be effected as soon as a network connection is verified, whereby written data 40 is transmissible at a first available opportunity to emergency dispatch.

The present method for automating emergency distress signals from a networked peripheral device 10 therefore enables an emergency distress signal 22 to be issuable from said peripheral device 100 when said peripheral device 100 senses deviation from a recorded pattern of movement 20, when a code word 50 is sensed in the speech of a user, and audio and video data is capturable and streamable over a network subsequent thereto, and a text alert message 80 is relayable to all peripheral devices 102 running the software application within a range of said peripheral device 100 issuing the emergency distress signal 22.

What is claimed is:

1. A method for automating emergency distress signals from a networked peripheral device comprising the steps of:
   in a peripheral device running a software application with settings enabling and disabling:
   writing a pattern of movement to memory indicative of typical geo-spatial positioning of a peripheral device over time whereby deviation from said pattern of movement by a specified factor is recognizable relative said stored pattern of movement, and an emergency distress signal is issuable thereby, said specified factor including;
   a distance factor applicable to known locations typical of a user's movements according to a known schedule;
   a velocity relative location factor, determined by inconsistent and unpredicted velocity relative a location previously established in the pattern of movement expected at a certain time;

activating voice recognition of a spoken term or phrase by a user as a code word whereby utterance of said code word in range of the peripheral device automates an emergency distress signal; and writing sensed audio and video data to memory and streaming said audio and video data captured by the peripheral device to emergency dispatch;

wherein an emergency distress signal is issuable from the peripheral device when the peripheral device senses deviation from a recorded pattern of movement, when the code word is sensed in the speech of a user, and audio and video data is capturable and steamtable over a network.

2. The method for automating emergency distress signals from a networked peripheral device of claim 1 further comprising the step of automating a call to a programmable telephone number at programmable intervals whereby a recorded message is playable once the call is received.

3. The method for automating emergency distress signals from a networked peripheral device of claim 2 further comprising the step of enabling sounding of an automated ring tone upon the said peripheral device after a desired time interval, when selected, and alternately when a code word is sensed in the speech of a user, wherein the peripheral device plays a recorded message when answered whereby the appearance of receiving a call is elicited.

4. The method for automating emergency distress signals from a networked peripheral device of claim 3 further comprising the step of sounding an alert message on other peripheral devices running the software application when an emergency distress signal is issued.

5. The method for automating emergency distress signals from a networked peripheral device of claim 4 wherein the alert message is sounded on other peripheral devices running the software application within a specified distance from the peripheral issuing the emergency distress signal.

6. The method for automating emergency distress signals from a networked peripheral device of claim 5 wherein the alert message includes a photograph of the user previously captured upon the peripheral device, said photograph transmissible to other peripheral devices and emergency responders as part of the alert message and emergency distress signal, whereby recognition of the user initiating the emergency distress signal and alert message is facilitated.

7. A method for automating emergency distress signals from a networked peripheral device comprising the steps of:

in a peripheral device running a software application with settings enabling and disabling:

writing a pattern of movement to memory indicative of typical geo-spatial positioning of a peripheral device over time whereby deviation from said pattern of movement by a specified factor is recognizable relative said stored pattern of movement, and an emergency distress signal is issuable thereby, said specified factor including;

a distance factor applicable to known locations typical of a user's movements according to a known schedule;

a velocity relative location factor, determined by inconsistent and unpredicted velocity relative a location previously established in the pattern of movement expected at a certain time;

activating voice recognition of a spoken term or phrase by a user as a code word whereby utterance of said code word in range of the peripheral device automates an emergency distress signal;

automating a call to a programmable telephone number at programmable intervals whereby a recorded message is playable once the call is received;

enabling sounding of an automated ring tone upon the peripheral device after a desired time interval, when selected, and alternately when the code word is sensed in the speech of a user, wherein the peripheral device plays a recorded message when answered whereby the appearance of receiving a call is elicited;

sounding an alert message on additional peripheral devices running the software application within a certain range of the peripheral device when an emergency distress signal is issued; and writing sensed audio and video data to memory and streaming said audio and video data captured by the peripheral device to emergency dispatch;

wherein an emergency distress signal is issuable from the peripheral device when the peripheral device senses deviation from a recorded pattern of movement, when the code word is sensed in the speech of a user, and audio and video data is capturable and steamtable over a network and an alert message is relayed to all peripheral devices running the software application within a range of said peripheral device issuing the emergency distress signal.

8. The method for automating emergency distress signals from a networked peripheral device of claim 1 wherein the specified factor includes:

an atypical movement relative established schedule factor, determined when present location data is inconsistent with expected location according to the established schedule;

an abrupt change factor determined by a sudden or unexpected change in movement; and an unrecognized location relative established schedule factor determined when a present location is unrecognized relative an expected location as part of the established schedule.

9. The method for automating emergency distress signals from a networked peripheral device of claim 7 wherein the specified factor includes:

an atypical movement relative established schedule factor, determined when present location data is inconsistent with expected location according to the established schedule;

an abrupt change factor determined by a sudden or unexpected change in movement; and an unrecognized location relative established schedule factor determined when a present location is unrecognized relative an expected location as part of the established schedule.

* * * * *